June 21, 1960      D. M. ROBERTS      2,941,756
RETRACTABLE LANDING WHEEL MECHANISM FOR AIRCRAFT
Filed June 21, 1957      3 Sheets-Sheet 1

INVENTOR
DENIS MAULE ROBERTS
BY
Watson, Cole, Grindle & Watson
ATTORNEYS

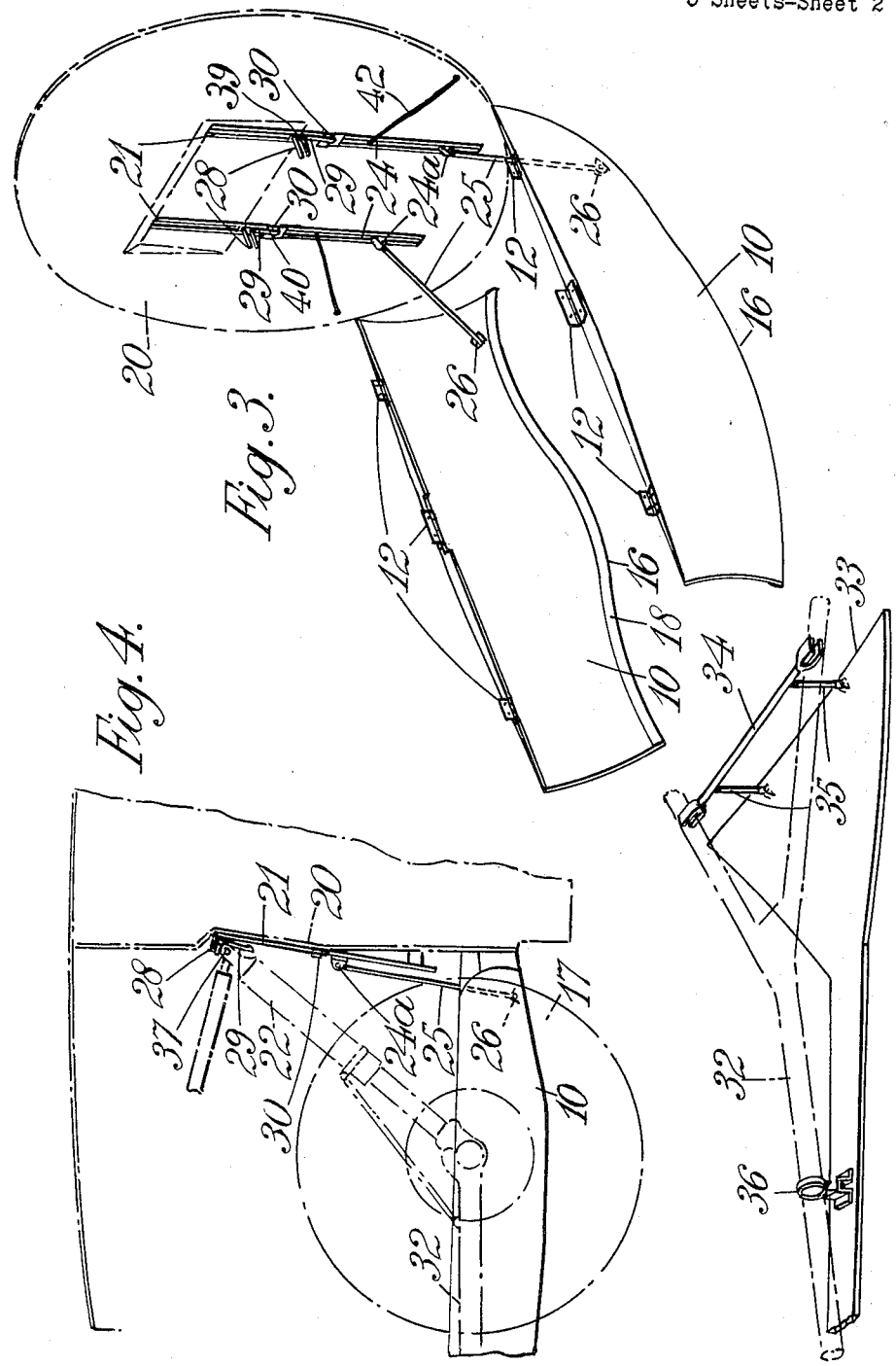

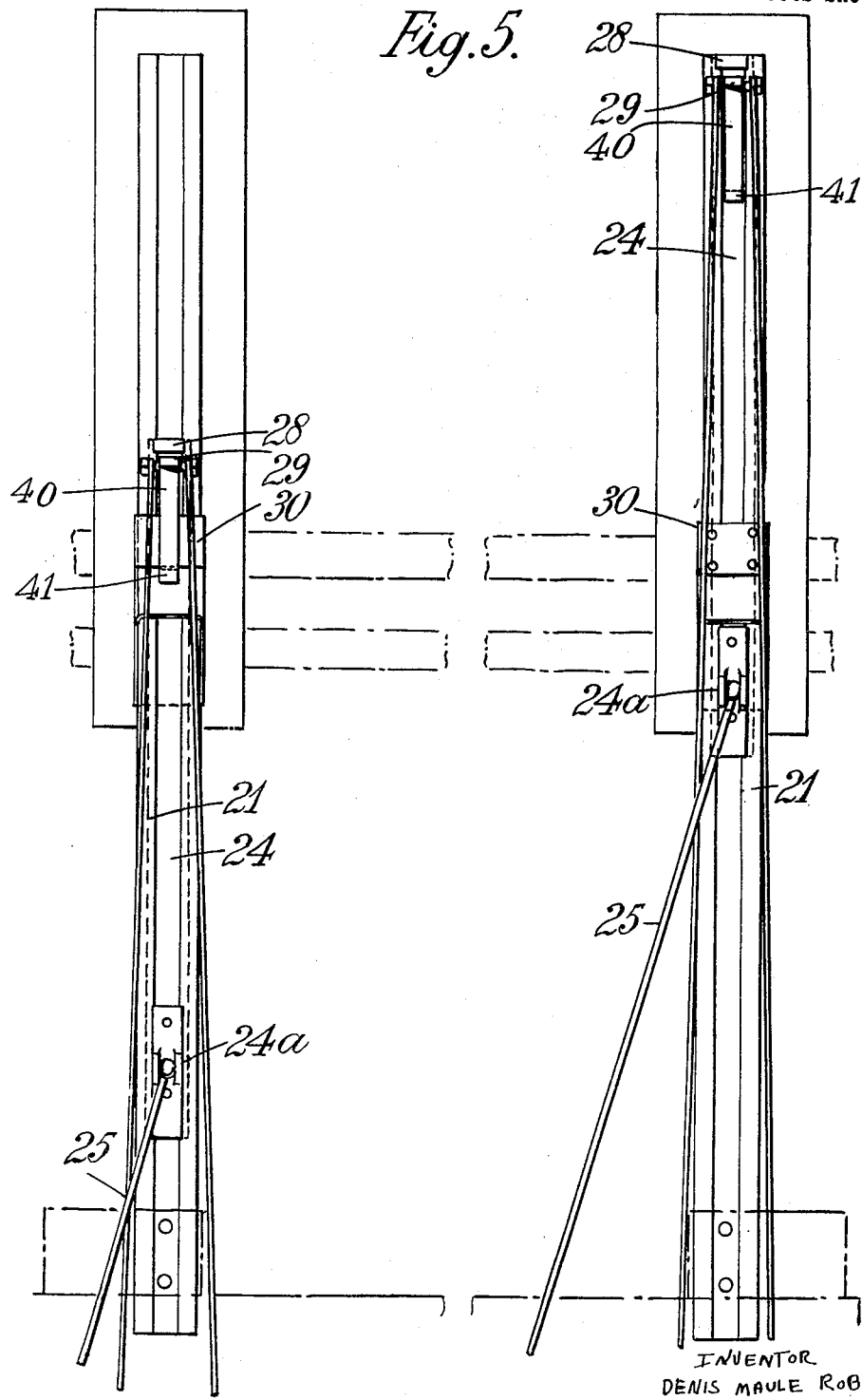

United States Patent Office 2,941,756
Patented June 21, 1960

2,941,756

RETRACTABLE LANDING WHEEL MECHANISM FOR AIRCRAFT

Denis Maule Roberts, Cranleigh, England, assignor to Transair Limited, London, England, a British company Filed June 21, 1957, Ser. No. 667,121

Claims priority, application Great Britain June 21, 1956

6 Claims. (Cl. 244—102)

The invention relates to aircraft which, as constructed by the makers, have main wheel wells which remain open when the wheels are retracted and constitute a source of considerable drag.

It is an object of the invention to reduce the drag by the provision of closure means for the wells and a further object is to provide such means which are simple in construction and reliable in operation. A still further object of one form of the invention is the provision of such means which may readily be incorporated as a modification to an existing aircraft.

In aircraft of the type with which the invention is concerned, each main wheel is carried by a strut which, in retracting, breaks at a knuckle joint intermediate in its length, the joint moving upwardly and forwardly into the well. There is also a radius rod connecting the wheel axle to a point on the aircraft structure at the rear of the well. The well is provided in a portion of the engine nacelle behind the engine compartment and divided therefrom by a partition or fire-wall. The wheel moves upwardly and forwardly during retraction and when in its raised position the lowermost portion thereof remains protruding from the well. An aircraft having a retractable landing device of this construction is disclosed, for example, in U.S. Patent No. 2,049,066.

According to the invention an aircraft of the above type is provided for each wheel well with a pair of doors hinged to the nacelle, about fore and aft axes alongside the well and adapted to close against the sides of the lower part of the wheel when raised, and means operable by the knuckle joint or an adjacent part of the strut as it moves upwardly, to effect closure of the doors.

It is preferred that the last part of the upward movement of the joint effects the closure.

There may also be provided, according to a preferred feature of the invention, a door or fairing which is attached to the radius rod and which closes the portion of the well behind the wheel when the wheel is retracted and the radius rod raised.

It is also preferred that there is a latch (or one latch for each door) which holds the doors in the open position and is released by the upward movement of the joint as a preliminary operation to the closing of the doors.

Figure 1:
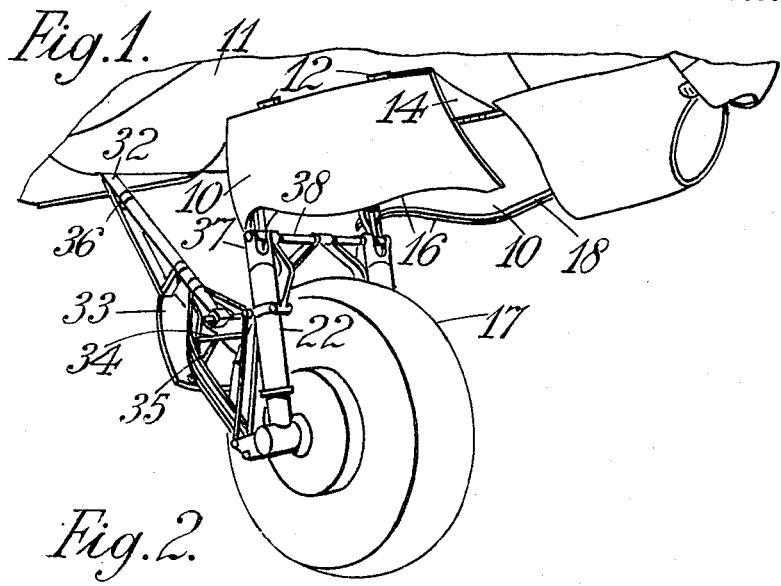
Figure 2:
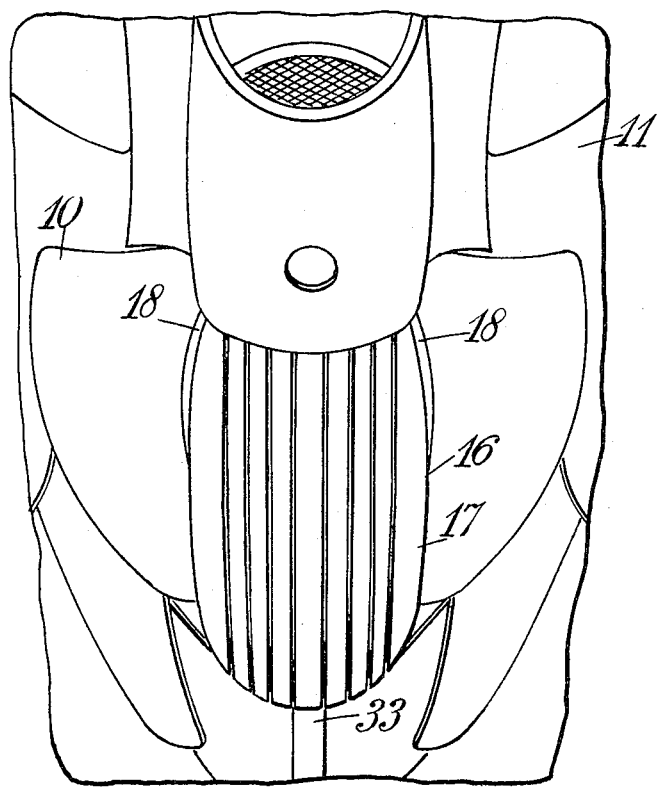

A specific example of the application of the invention to an existing aircraft will now be described with reference to the accompanying drawings in which:

Figure 1 is a perspective view showing one main wheel of the aircraft, in lowered position and the doors open, Figure 2 is a perspective view from the front and below of the main wheel in raised position and the doors closed, Figure 3 is a diagrammatic perspective view from above and behind showing the doors open and the operating means for the doors, Figure 4 is a side view showing the nacelle doors and Figure 5 is a view from the rear, of the fire wall and the parts of the door mechanism which are attached thereto. This figure shows on the left side the parts in the doors open position and on the right side the parts in the doors closed position.

The arrangement for each main wheel is the same and only one will be described.

In this example there are a pair of moulded fibreglass doors 10 which are hinged to the engine nacelle 11 about fore and aft axes 12 at each side of the wheel well 14. The edges 16 of the doors are shaped to fit against the sides of the tyre 17 when the wheel is retracted, thereby to leave the lower part of the tyre exposed. The door edges have brushes 18 or other resilient material for engaging the tyre.

Attached to the fire wall 20 at the front of the well 14 there are, in accordance with the invention, two upright channels 21 with under-cut or dove-tail edges. The channels are spaced by an amount equal to or a little less than the spacing of the wheel struts 22 and slope upwardly and forwardly at a small angle to the vertical (see Figure 4).

In each channel there is a dovetail slide 24 which is of substantial length and is held in place by the undercut edges. The lower end 24a of each slide is connected by a link 25 and universal joints to a bracket 26 on the inside of the corresponding door 10. At the upper end each slide has a short rearwardly directed arm 28 and, immediately beneath the arm 28, a latch 29. The latch is in the form of a bell-crank of which one limb 39 extends rearwardly and lies under the arm 28 on the slide and the other limb 40 extends downwardly and has a latch hook 41 at its lower end for latching engagement under the lower edge of a plate 30 fixed across the mouth of the channel at the lower end of the movement of the latch. The hook is spring-loaded toward the channel so that it tends to engage positively under the plate when the latch is at its lower end of movement in the channel.

Stretched between each slide and attachment points low down on the fire wall there are two rubber bungees shown diagrammatically at 42 which urge the doors to the open position.

The radius rod 32 of the undercarriage is of Y form and secured to the underside thereof there is, in accordance with this example, a door or fairing 33 of corresponding outline. The door 33 is positioned and shaped to close the rear portion of the wheel-well when the rod is raised. To secure the door there is a cross-bar 34 fixed between the arms of the rod 32 with a pair of adjustable dependent arms 35 to which the door is attached and an attachment bracket 36 secured to the leg of the rod.

In the operation of the above construction, the first and major part of the retraction of the wheel is idle so far as the operation of the wheel doors is concerned. Towards the end of the movement the knuckle joints 37 of the wheel struts (or the wheel arch 38, or abutments attached thereto) contact the rear limbs of the latches (see Figure 4) and raise the limbs to disengage the latch hooks from the plates 30 and to engage the limbs with the arms 28 on the slides 24. As retraction progresses the joints 37 push the slides upwardly and so draw the doors 10 towards their closed position which they reach when the wheel is fully raised. When raised the rear of the well is closed by the fairing on the radius rod.

On lowering of the wheel the doors are opened by the bungees which pull the slides 24 downwardly until the latches engage.

I claim:

1. In an aircraft of the type having on a wing at each side of a fuselage, an engine nacelle formed with a wheel-well in a compartment behind the engine and separated therefrom by an upright partition constituting the front wall of the well, said well having a downwardly facing mouth, a main landing wheel which is retractable upwardly into a position in which its upper part lies within the well and its lower part protrudes from the mouth of the well, a strut carrying said wheel at one end and pivoted at its other end within the well to the aircraft structure, said strut being in two parts hinged together at a knuckle joint which moves upwardly and forwardly into the well during retraction of the wheel, and a radius rod connecting the wheel-carrying end of the strut with a fixed part of the aircraft structure at the rear of the well, the provision for each wheel well of a pair of doors hinged to the nacelle about fore and aft axes alongside opposite side of the mouth of the well respectively and operable to close against the sides of the protruding lower part of the wheel when it is retracted and means operable by the knuckle joint as it moves upwardly to effect closure of the doors, said means comprising for each door an upwardly extending guideway attached to the front wall of the well, a slide guided by said guideway for movement therealong and having an abutment engageable by said knuckle joint as it moves upwardly to effect such movement of the slide and a link connecting said slide to said door for effecting closing of the door as the slide moves upwardly.

2. In an aircraft, means as claimed in claim 1 the provision of a latch carried by said slide and engageable in holding relation with the guideway to retain the slide at the lower limit of the travel, said latch being releasable by engagement therewith of the knuckle joint as it moves upwardly.

3. In an aircraft, means as claimed in claim 1 the provision of a latch consisting of a lever pivoted to said slide, one arm of the lever being engageable in releasable latching relation with the guideway to retain the slide at the lower limit of its travel and the other arm of the lever constituting the abutment aforesaid and also being movable by engagement therewith of the knuckle joint to rock the lever to release the said latching engagement, and stop means limiting the rocking movement of the abutment beyond that necessary to effect said release.

4. In an aircraft or the like, the combination comprising a nacelle having a wheel-well therein, said well having at least one end wall, a pair of doors hinged to said nacelle to pivot about axes parallel to the axis of said nacelle, a pair of channels on said end wall, a slide in each of said channels, a link mechanism connecting each slide to one of said doors, and retractable wheel means for moving said slides during retraction thereof to actuate said doors.

5. The combination according to claim 4, wherein said retractable wheel means includes a pair of knuckle joints and wherein each of said slides has an abutment thereon positioned to engage said knuckle joint when said retractable wheel means is retracted.

6. The combination according to claim 5, wherein each slide has a latch thereon and wherein a latch plate is fixed across each channel to limit the movement of each of said slides and engagement of said latch and said latch plate holds said door in the open position.

References Cited in the file of this patent

UNITED STATES PATENTS

| | | |
|---|---|---|
| 2,049,066 | Kindelberger | July 28, 1936 |
| 2,429,992 | Crispell | Nov. 4, 1947 |
| 2,432,408 | Glasgow et al. | Dec. 9, 1947 |

FOREIGN PATENTS

| | | |
|---|---|---|
| 418,468 | Great Britain | Oct. 25, 1934 |